United States Patent [19]

Trepagnier

[11] Patent Number: 5,400,132
[45] Date of Patent: Mar. 21, 1995

[54] RECTIFICATION OF A LASER POINTING DEVICE

[75] Inventor: Pierre Trepagnier, Winchester, Mass.

[73] Assignee: General Scanning, Watertown, Mass.

[21] Appl. No.: 135,270

[22] Filed: Oct. 12, 1993

[51] Int. Cl.$^6$ ............................................. G01B 11/00
[52] U.S. Cl. ................................. 356/138; 356/153; 356/400; 219/121.78; 364/167.01; 364/571.04
[58] Field of Search ............... 356/138, 153, 400, 399; 219/121.78; 364/167.01, 571.04

[56] References Cited

U.S. PATENT DOCUMENTS

| | | | |
|---|---|---|---|
| 4,520,261 | 5/1985 | Tsutsumi | 250/203 |
| 4,532,402 | 7/1985 | Overbeck | 219/121.78 |
| 4,618,759 | 10/1986 | Muller et al. | 219/121.78 |
| 4,713,537 | 8/1986 | Kunz et al. | 250/227 |
| 4,769,523 | 9/1988 | Tanimoto et al. | 219/121.6 |
| 4,791,591 | 12/1988 | Asanuma et al. | 364/571.04 |
| 4,918,284 | 4/1990 | Weisz | 219/121.78 |
| 4,941,082 | 7/1990 | Pailthorp et al. | 364/167.01 |
| 5,011,282 | 4/1991 | Ream et al. | 356/153 |
| 5,124,524 | 6/1992 | Schuster et al. | 219/121.78 |
| 5,171,963 | 12/1992 | Saruta et al. | 219/121.69 |

OTHER PUBLICATIONS

Leica; Product Information Brochure; "Smart 310—Measuring Movements", undated.
Third Annual Microelectronics Measurement Technology Seminar Proceedings; "A Technique for Automatic Focusing and Alignment of Monolithic Circuits for Laser Trimming"; pp. I-30-I-43 (1981).
Palmateer; Reprint from Tooling for Composites Conference; "Optical Layout Template for Locating Composite Plies During Fabrication", (1993).

*Primary Examiner*—F. L. Evans
*Attorney, Agent, or Firm*—Fish & Richardson

[57] ABSTRACT

Methods of compensating for errors in a laser pointing device, particularly for use in three-dimensional applications, by accurately controlling the angle that the laser beam makes in space.

A method for rectifying a laser pointing device that aims a laser beam by deflecting the beam through a plurality of optical deflection devices each directed by a galvanometer controlled by an input. In the method, the laser pointing device is established in an accurate angular relationship to at least four fiducial points. The angular errors internal of the laser pointing device are determined by comparing actual galvanometer inputs to nominal galvanometer inputs, assuming no error in the established angular relationship. The actual galvanometer inputs are those that aim the laser beam at the fiducial points (while recognizing the existence of the internal errors), and the nominal galvanometer inputs are those that would aim the laser beam at the fiducial points assuming no internal errors in the laser pointing device. The angular errors are stored in a form for use during scanning by the laser pointing device to compensate for the internal errors in converting nominal direction numbers computed by a control to actual galvanometer inputs.

24 Claims, 7 Drawing Sheets

RECTIFICATION OF A LASER POINTING DEVICE

BACKGROUND OF THE INVENTION

The invention relates to the control of laser pointing devices, and more particularly to rectifying a pointing device to allow a pointing device with normal manufacturing tolerances to behave like a mathematically ideal device, thereby simplifying control and improving accuracy, and to improve the utility of laser pointing devices in three-dimensional applications.

Numerically-controlled galvanometers have been used in laser pointing devices for two-dimensional applications, for instance x-ray plotters, repair of semiconductor memories, and laser light shows. These generate patterns on specified two-dimensional working surfaces, e.g., x-ray film, a semiconductor chip, or a curved (but nonetheless two-dimensional) domed ceiling, respectively.

Two technical barriers have limited the use of laser pointing devices in three-dimensional applications: the computing power required to compute the trigonometry to drive the galvanometers (this barrier has fallen in recent years), and equipment and techniques to ensure that the angular control of the galvanometers is sufficiently precise and accurate while maintaining sufficient speed and acceleration.

To use a laser pointing device in a high-accuracy, high-precision application, for instance in the aerospace industry, it must be positioned very accurately over a work piece or tool if it is to illuminate points on the work piece accurately. In one known technique called resectioning, a designator (a device similar in concept to a laser light projector, though operating at higher precision, used to sweep a laser beam over a surface to illuminate a curve, for instance to indicate an outline for a work piece) automatically determines its position and orientation relative to a tool by measuring the angles to three or more fiducial points on the tool. A fiducial point, or simply fiducial, is an optical device whose position is accurately known, for instance with respect to the tool on which it is mounted. The tool is brought roughly into position with respect to the designator, for instance to within six inches. The designator (or other external optical devices) are used to sense the fiducials and measure the angles from the designator to them, and thus to accurately orient the spatial and angular position of the designator with respect to the tool.

But no matter how accurately the designator is positioned relative to the tool, the designator cannot designate points accurately if the beam deflection angles cannot be controlled accurately. Nor can resectioning be accurate if the galvanometers cannot accurately measure spatial angles to the fiducial points.

The components of the designator are subject to a number of sources of imprecision, and each designator will come off the assembly line with slightly different response to its inputs. Sources of imprecision internal to the designator include non-linearities in the galvanometer response and the position detectors, differences in gain in op-amps driving the galvanometers, bearing run-out, tolerance in the mounting of the galvanometers in the designator, twist or wobble in the galvanometer shafts, mirrors mounted slightly off-axis, variations in the mounting of the laser or other beam-steering elements, etc.

Prior approaches to compensating for errors in galvanometer-based beam positioning devices have obtained accurate beam placement on a predetermined two-dimensional surface by calibrating the beam positioning device to that surface, as exemplified in U.S. Pat. Nos. 4,918,284 and 4,941,082.

Another prior approach involves constraining certain of the designator's manufacturing tolerances as closely as possible, and precisely measuring the residual errors in the completed device. The remaining errors are measured and compensated for in the controller of the device, typically a computer, by the following method. The galvanometers are fed nominal values as if the galvanometers were ideal (nominal values are the values that should lead to a given result in an ideal device), for instance to generate angles along each of two perpendicular axes at five-degree intervals. The actual angles of the resulting beams are measured, for instance by measuring the positions of two points on each ray using a theodolite, and reconstructing the ray in space from these two points. These measurements are used to characterize the non-linearities and deviations of the physical device from the mathematically predicted behavior.

SUMMARY OF THE INVENTION

The invention provides improved methods of compensating for errors in a laser pointing device, especially advantageously used in three-dimensional applications, by accurately controlling the angle that the laser beam makes in space. The process of compensating for mechanical and electrical tolerances, and thus turning the designator into an accurate angle measuring machine, is called rectification. With the accurate and precise angular control provided by the invention, it becomes possible to accurately aim a laser at a given point on any arbitrary surface, no matter where the surface is located in a three-dimensional volume.

In general, in a first aspect, the invention features a method for rectifying a laser pointing device that aims a laser beam by deflecting the beam through a plurality of optical deflection devices each directed by a galvanometer controlled by an input. In the method, the laser pointing device is established in an accurate angular relationship to at least four fiducial points. The angular errors internal of the designator are determined by comparing actual galvanometer inputs to nominal galvanometer inputs, assuming no error in the established angular relationship. The actual galvanometer inputs are those that aim the laser beam at the fiducial points (while recognizing the existence of the internal errors), and the nominal galvanometer inputs are those that would aim the laser beam at the fiducial points assuming no internal errors in the laser pointing device. The angular errors are stored in a form for use during scanning by the laser pointing device to compensate for the internal errors in converting nominal direction numbers computed by a control to actual galvanometer inputs.

Preferred embodiments of the invention may include the following. The positioning step includes the steps of providing a plane mirror in a known angular relationship to the fiducial points; providing predetermined inputs to the galvanometers; adjusting the angular position of the laser pointing device so that the beam is reflected back on itself to establish a perpendicular to a fiducial plane; and adjusting the spatial position of the laser pointing device relative to the fiducial points to aim the beam at a predetermined point with the galvanometers at the predetermined input. The laser pointer device and the rectification method are used to locate points in three dimensions. The number of the fiducial points is at least six. To aim the beam at the fiducial points, a coarse scan followed by a fine scan are used, and the centroid of the fiducial point computed. The rectification method is stored as an interpolation function. The rectification method is stored as a polynomial with parametric coefficients. At least some of the fiducial points are each defined by an optical device configured to reflect any incident beam back upon itself without regard to the angle of incidence; and the laser pointing device includes a detector to detect the reflected beam and to detect the input to the galvanometers when the reflected beam is detected. The fiducial points lie substantially in a plane. The positioning step and the developing a rectification method step are performed substantially simultaneously by iterative convergence. The fiducial points do not lie in a single plane.

In a second aspect, the invention features a method for establishing the position of a laser pointing device relative to a plurality of fiducial points each having a precisely-known location. The method includes the steps: providing an optical device for detecting perpendicularity of a beam to a plane in a known angular relationship to a coordinate system of the fiducial points; and adjusting the angular position of the laser pointing device relative to the fiducial points so that the optical device detects the perpendicularity.

Preferred embodiments of the second aspect of the invention may include the following. The optical device includes a mirror in the plane and a detector for detecting when the mirror reflects the beam on itself.

In a third aspect, the invention features a method for measuring the position of an optically responsive device with a laser pointing device, including the steps of controlling the optical deflection devices via the galvanometers to aim the beam at each of a plurality of points in the vicinity of the optically responsive device, and combining the values of the galvanometer inputs at each of the plurality of points that generates a response in the optically responsive device to find the centroid of the optically responsive device.

The invention features the following advantages. Three-dimensional applications become practical: in correcting the output angles to conform to the nominal angles generated by the control computer regardless of internal imprecision, the invention imparts a new degree of angular precision to designators. Accurate and precise rectification becomes practical: a designator can be rectified in a few minutes in a relatively inexpensive test stand. A designator can be rectified with respect to a large number of fiducial points at almost no marginal labor cost, resulting in better rectification that takes better account of the inter-confounding effects and non-linearities of the manufacturing tolerances in the designator. The invention finds an exact rectification function rather than iterating to an approximate rectification function. The invention overcomes the need to manufacture the mechanical parts of a designator to exceptionally close tolerances.

Other objects, advantages and features of the invention will become apparent from the following description of a preferred embodiment, and from the drawing.

DESCRIPTION OF THE PREFERRED EMBODIMENTS

Figure 1:
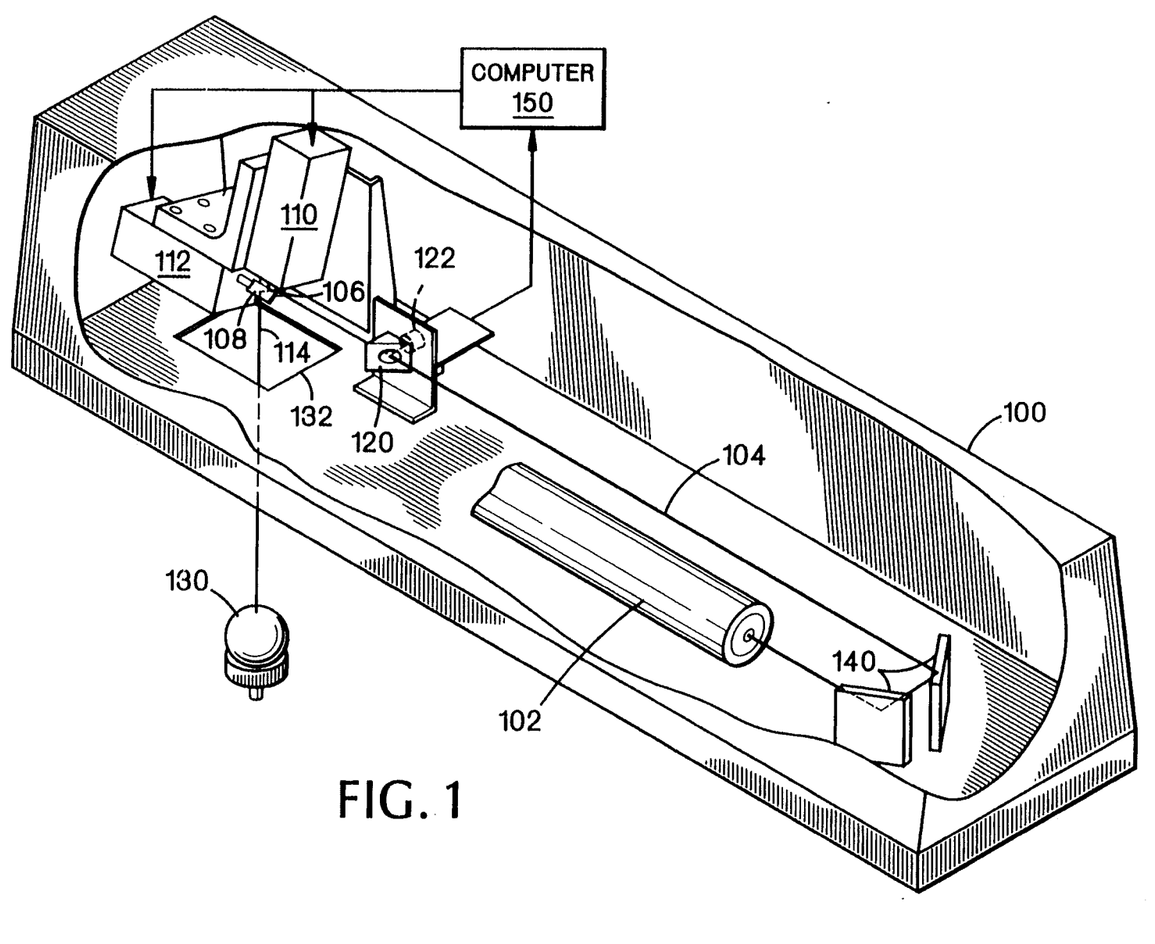
FIG. 1 is a cutaway perspective view of a designator head.

FIG. 1 shows designator head 100, with laser source 102 and galvanometer mirrors 106, 108. Laser 102 produces beam 104 that is reflected by steering mirrors 140 to x mirror 106 and y mirror 108. The x and y mirrors are controlled by galvanometer motors 110 and 112. After being reflected by the x and y mirrors, the beam 114 emerges from designator head 100 through aperture 132. If beam 114 hits reflective fiducial 130, it is reflected back on itself to y and x mirrors 108, 106. Reflected beam 104 hits beam splitter 120, a partially-silvered mirror, and the split portion of the beam hits photodetector 122, a photodiode. In response, detection electronics and an amplifier (not shown) generate an interrupt signal to computer 150.

Figure 2:
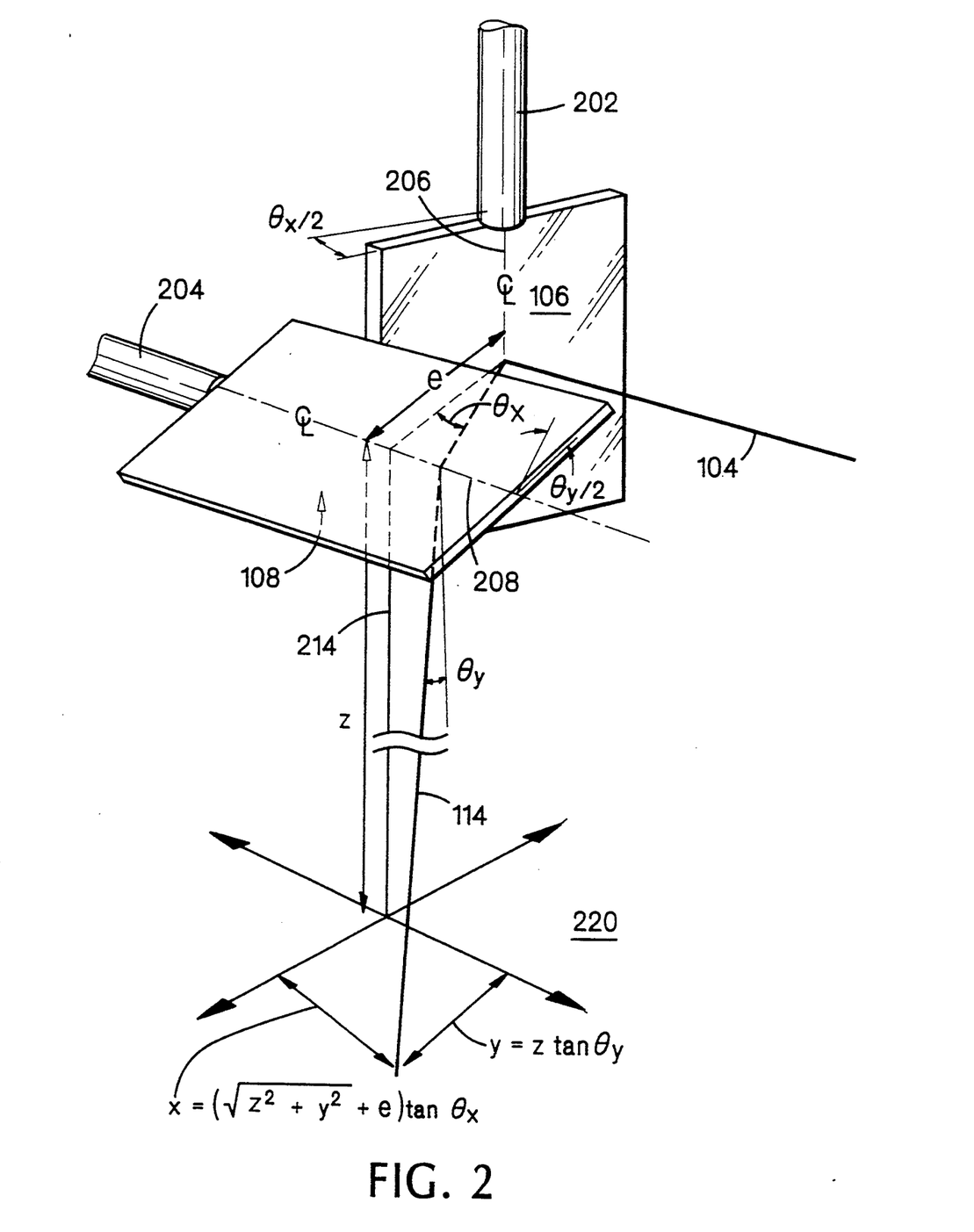
FIG. 2 is a detail of FIG. 1, focusing on the galvanometer mirrors and the incident and reflected beams.

FIG. 2 shows beam 104 entering from the right, being reflected off x mirror 106 and y mirror 108, deflecting the beam from the zero deflection axis 214 by angles $\theta_x$ and $\theta_y$, respectively, and emerging as emergent beam 114 down to a target. If x mirror 106 were perfectly mounted on shaft 202, the face of x mirror 106 would lie exactly on axis 206 of shaft 202. Similarly, the face of a perfect y mirror 108 would lie exactly on axis 208 of shaft 204, and y axis 208 would be exactly perpendicular to x axis 206. The mirror separation distance, measure perpendicular to both axes 206 and 208, is e. The point at which the beam hits surface 220 at vertical distance z from the center point of y mirror 108 is at location $$(x,y) = ((\sqrt{z^2 + y^2} + e)\tan\theta_x,\ z\tan\theta_y)$$

This equation describes the behavior of ideal galvanometers.

But, in general, the galvanometers and mirrors are not ideal. Because of internal tolerances, when computer 150 directs the galvanometers to deflect incident beam 104 to an emergent beam 114 at angle $(\theta_x, \theta_y)$, the beam actually emerges at an angle $(\theta_x + \delta\theta_x, \theta_y + \delta\theta_y)$, where the $\delta$ terms denote the errors between the nominal angles of an ideal galvanometer and the actual angles produced by the physical galvanometers. Rectification is the process of measuring these $\delta$'s, and accommodating them in the control.

In the invention, the actual angles beam $(\theta_x + \delta\theta_x, \theta_y + \delta\theta_y)$ are measured for each of a plurality of nominal rays $(\theta_x, \theta_y)$. One end is at the ray's virtual origin at the Y mirror 108, fixed using optical and mechanical fixturing. The position of the other end of the ray is determined using the plurality of fiducials 130. In this way, two points are determined for each ray, thus determining the three-dimensional angle of the ray.

Figure 3:
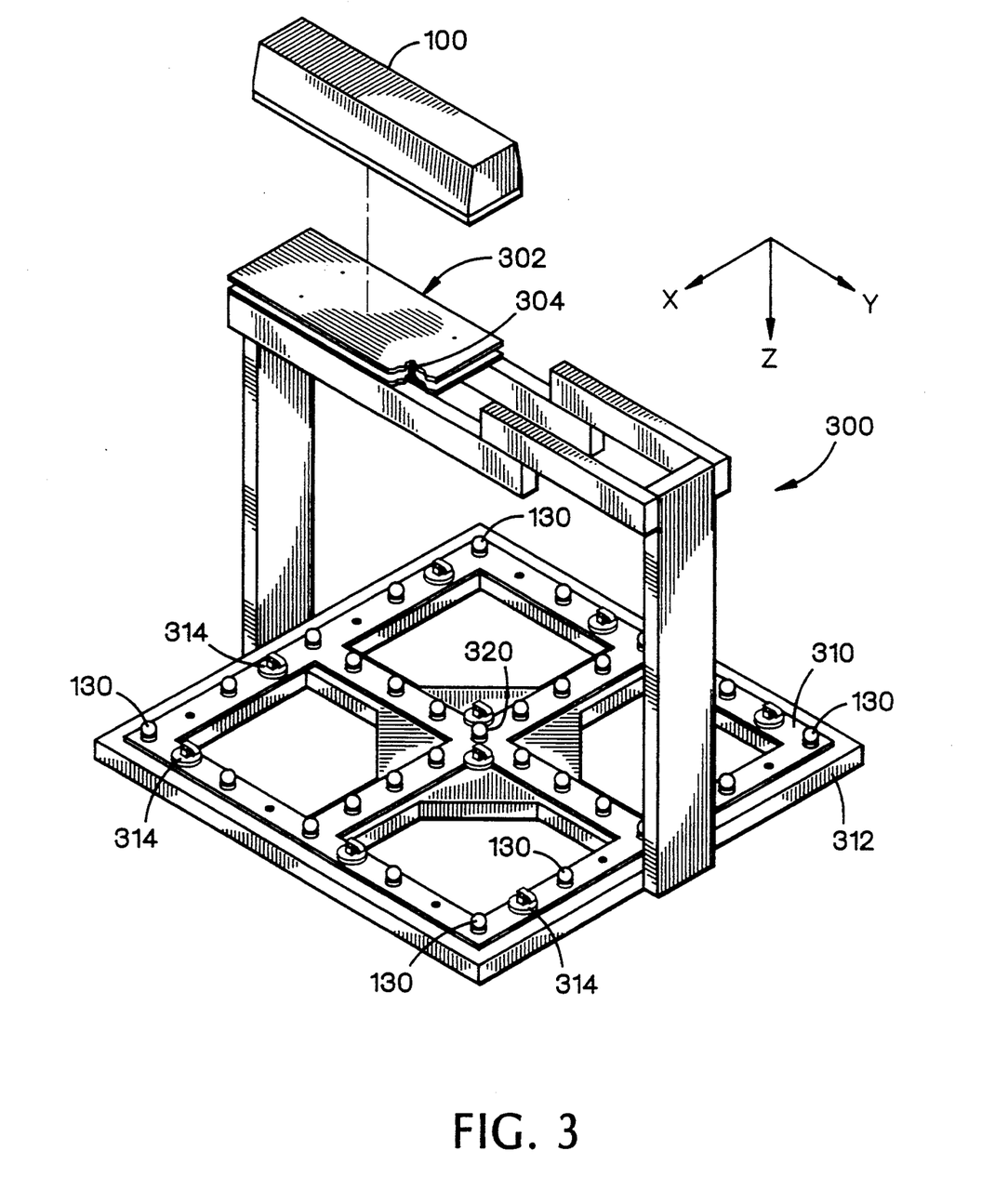
FIG. 3 shows a rectification fixture and a designator head.
Figure 5A:
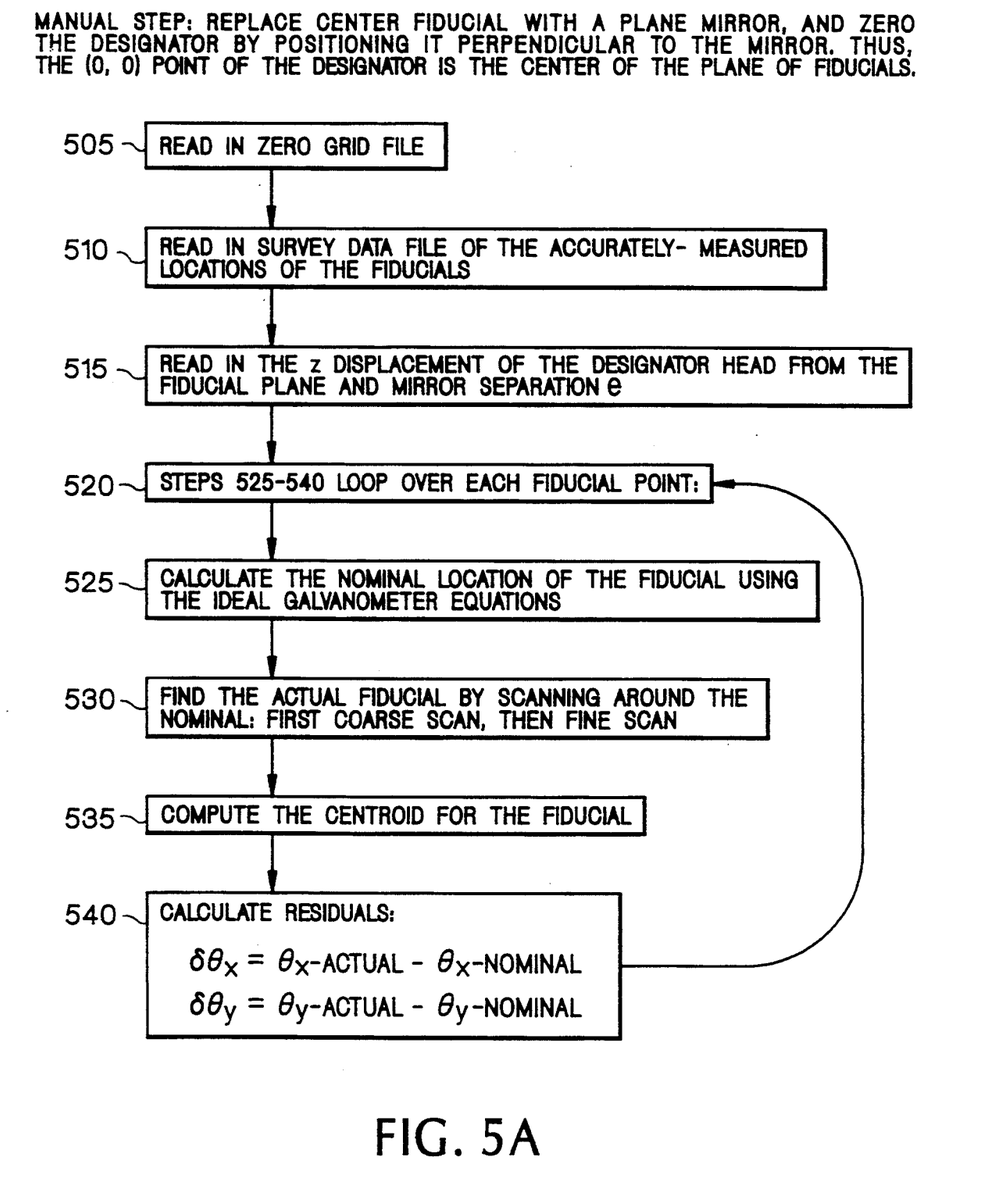
FIGS. 5A and 5B is a flow chart of a first embodiment of the rectification process.
Figure 5B:
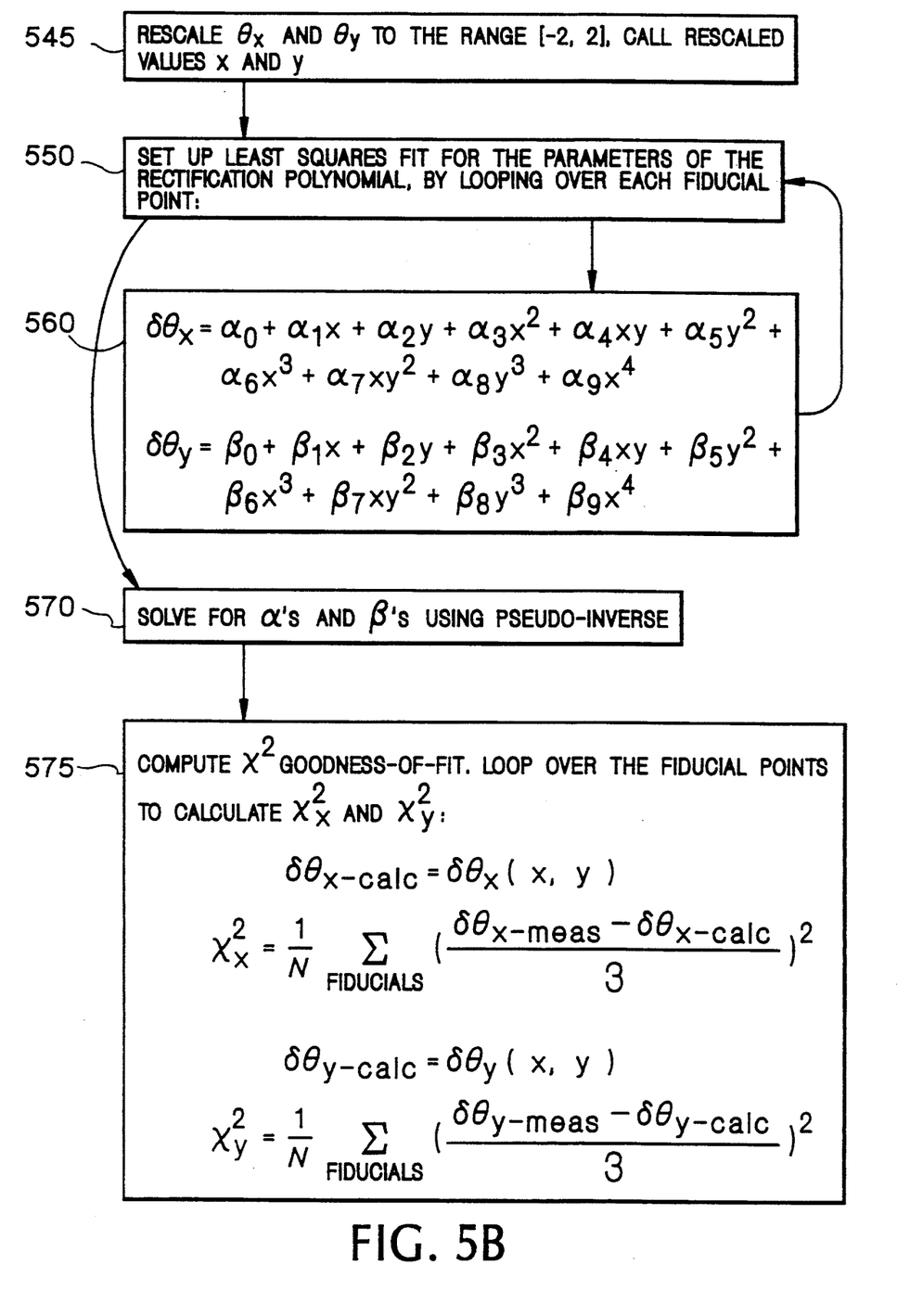

Referring to FIG. 3, a designator head 100 to be rectified is mounted onto a rectification fixture 300 on an adjustable mounting plate 302. Mounting plate 302 is at a carefully-measured height above the fiducials, and allows the angles of the designator head relative to the rectification fixture to be adjusted by means of stacked belleville washers 304. A plurality of clamps 314 clamp fiducial plate 310 to base plate 312 and allow the fiducial plate to be translated in the x and y directions and rotated about the z axis. Fiducial plate 310 mounts twenty-one fiducials 130 at precisely-known locations in a 5×5 array. Generally, it is desired to have at least twice the number of fiducials as free parameters in each of the x and y rectification polynomials (see polynomial 560 in FIG. 5). It is desirable to have the array of fiducials subtend a large portion of the solid angle over which the galvanometers will be expected to sweep in their actual application.

In a preferred embodiment, fiducials 130 are corner prisms that reflect an incident beam back on itself, so that the beam will be registered by photodetector 122 as discussed in connection with FIG. 1. In each fiducial, the corner cube is set into a sphere with its vertex at the center of the sphere. The entry pupil of the fiducial is about $\frac{1}{4}''$ to $\frac{3}{8}''$ diameter. The sphere is set in a chuck and attached to the chuck by a magnet. Thus, the fiducial can be rotated to be aimed, but the vertex remains fixed at the center of the sphere. The chuck has a $\frac{1}{4}''$ shaft that engages a bushed hole in fiducial plate 310.

The fiducial 320 in the center of the array has a special role that will be discussed in connection with FIG. 5.

Figure 4:
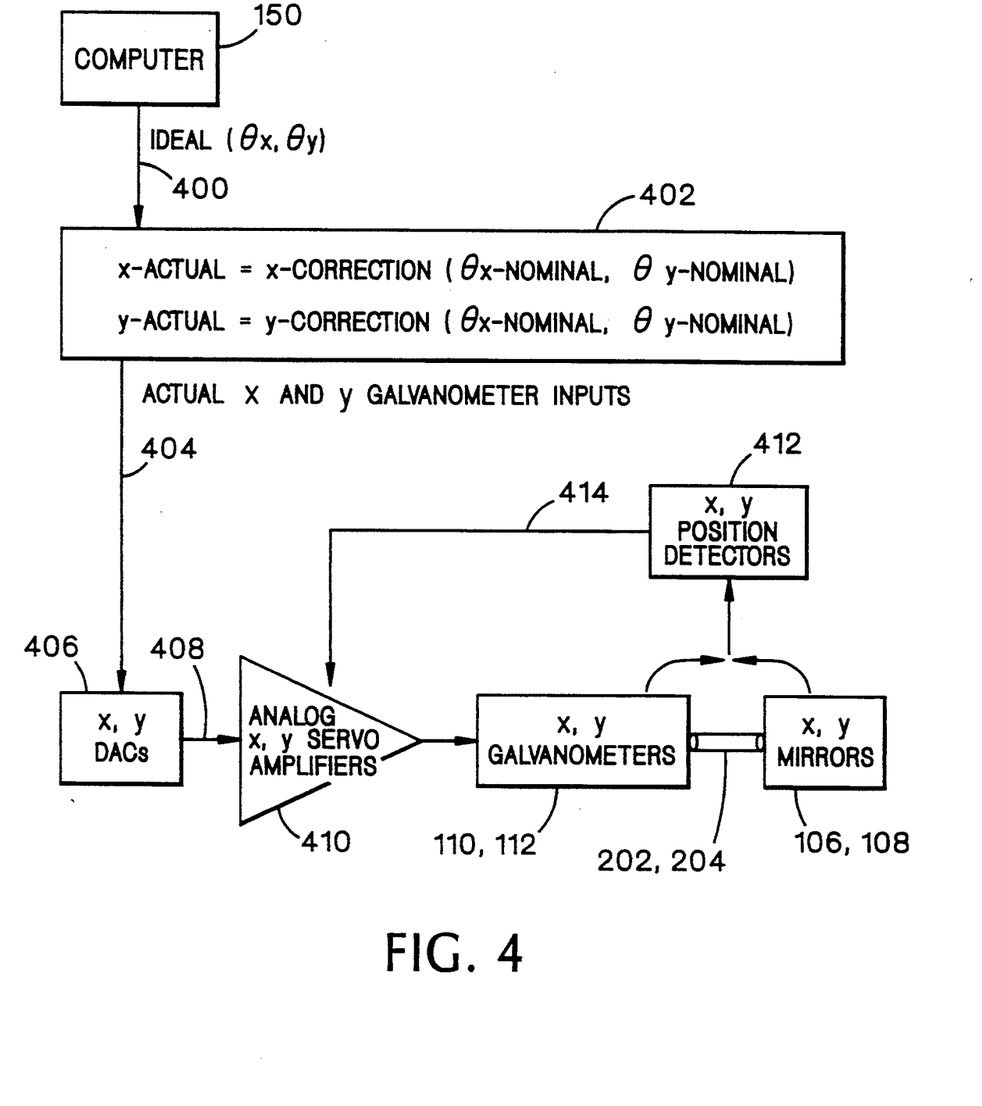
FIG. 4 is a block diagram of a designator and its control.

Referring to FIG. 4, when the designator is in operation, computer 150 generates ideal $\theta_x$ and $\theta_y$ values 400 to control $\theta_x$ and $\theta_y$ galvanometers 110,112 as if the system were ideal. The values produced as ideal $\theta_x$ and $\theta_y$ values are integers ranging from 0 to 65,535. The units of this value are called "least counts." Ideal-to-actual correction box 402 converts ideal $\theta_x$ and $\theta_y$ values 400 to corrected x and y galvanometer inputs 404. (The inputs to box 402 may be in any convenient units, typically angles, direction cosines, or galvanometer counts. Similarly, the corrections may be applied in any convenient units.) Digital-to-analog converter 406 converts these corrected values to analog drive signals 408, which are amplified by amplifiers 410 to drive x and y galvanometers 110,112. Position detectors 412 monitor either galvanometers 110,112 or the mirrors 106,108 themselves, and provide feedback 414 to the amplifiers. In one embodiment, computer 150 is based on an Intel 80486 microprocessor, and correction box 402 is implemented using a Motorola 56001 microprocessor.

The correction applied by ideal-to-actual correction box 402 to each output coordinate is a function of both input coordinates, that is, a function of two spatial variables that together specify a nominal angle to a point in space, for instance $\theta_x$ and $\theta_y$ mirror deflection angles or galvanometer inputs. The rectification function applied by this box may be computed by interpolation, by polynomial evaluation, or any of a number of other techniques. The rectification function produces a pair of values, each value correcting one of the input spatial variables. It is desirable that correction box 402 be programmable during rectification to apply corrections of zero, so that the input nominal $\theta_x$ and $\theta_y$ values will be output unaltered.

An example of a rectification polynomial will be discussed below.

Rectification is the process of determining the correct rectification function for correction box 402, so that designator 100 will generate the correct angles in response to the ideal angles computed by control computer 150. For instance, if a non-rectified designator were resectioned over a tool, the designator might measure the angles incorrectly, leading to incorrect calculation of its position and orientation over the tool.

FIG. 5 is a flow diagram for the rectification process.

The first step 500 in rectification is to establish orthogonality. Designator head 100 is mounted in the mounting plate 302, and the galvanometers are fed their (0,0) inputs. The center fiducial 320 is removed from the fiducial plate, and replaced with a flat mirror. A sheet of translucent material, for instance graph paper, drafting film or acetate, is placed over aperture 132. The translucent material makes the beam visible, both at the point at which it emerges from the designator and the spot reflected from the mirror. Using a screwdriver, the angle of mounting plate 302 and designator head 100 mounted thereon are adjusted by means of belleville washers 304 until the emergent beam and the reflected beam are superimposed. The designator beam is now known to be perpendicular to the fiducial plate.

The mirror is removed, and center fiducial 320 is reinstalled in its place. Clamps 314 are loosened, and fiducial plate 310 is moved on top of base plate 312 so that the center of the fiducial plate is at the (0,0) point of the designator. The designator may be directed to trace the x and y axes so that the fiducial plate can be rotated about the (0,0) center to zero not only the origin but the axes. Then clamps 314 are clamped down, locking the designator head and the fiducials into a fixed relationship.

The remaining steps of rectification are implemented in software. In step 505, the software loads a zero grid file into the correction box 402, so that input nominal $\theta_x$ and $\theta_y$ values 400 pass unaltered to the output 404. In step 510, the software reads in survey data, highly accurate measured locations of the fiducial points. In step 515, the software reads the height z of the center of y mirror 108 above the plane of fiducials, and the separation distance e between the two mirrors. The value of e is taken from the engineering drawings rather than actually measured.

In steps 520–535, the software directs the designator to search for and accurately measure actual galvanometer inputs that place the beam on each of the fiducials. From the survey data, the software in step 525 calculates the nominal $\theta_x$ and $\theta_y$ angles at which the fiducial should be found, using the ideal galvanometer equations. In step 530 the software directs the designator to do a coarse search about the nominal location with a high-speed scan to roughly locate the fiducial. Recall that the fiducial is found when the beam is retroreflected from the corner prism in the fiducial, and detected by photodetector 122, which in turn generates an interrupt to control processor 150. Because of slew delay in the mechanical and software portions of the system, by the time the interrupt reaches the control software, the beam will in general have moved off the fiducial. Thus, once the fiducial is roughly located with a coarse scan, processor 150 directs the beam in a fine scan, moving the galvanometers in small steps in a pattern somewhat larger than the fiducial, and stopping to allow the galvanometers to settle between each command. Because the beam has finite width, about 0.040", and the fiducial has a finite entry pupil, multiple galvanometer inputs, generally distributed circularly, will produce a detection response in photodetector 122. In step 535, the software computes the centroid of these responding inputs. In the present embodiment, the response of photodetector 122 is a simple binary "yes" or "no," and thus the centroid computation is simply the average of the galvanometer inputs that produce a positive response. If the photodetector had a grey scale response, for instance to indicate a proportion of the laser spot being reflected by the fiducial, the centroid computation could take a weighted average. The coarse scan, fine scan, and centroid operations are repeated for each fiducial.

This first phase program ends by writing to a file the z and e values, and the nominal and measured centroid location for each fiducial. The second phase program reads this file in and continues the rectification process.

Once the centroid is determined, in step 540 the software calculates a residual, $\delta\theta_x$ and $\delta\theta_y$, the differences between the measured angles to the centroid of the fiducial and the nominal angles for each fiducial:

$$\delta\theta_x = \theta_{x\text{-actual}} - \theta_{x\text{-nominal}}$$

$$\delta\theta_y = \theta_{y\text{-actual}} - \theta_{y\text{-nominal}}$$

In order to better condition the values for matrix multiplication, the galvanometer values of $\theta_x$ and $\theta_y$ that range from 0 to 65,535 are rescaled in step 545 into the range $[-2,2]$. These rescaled values are called "x" and "y" in the remainder of FIG. 5. In steps 550–570, the twentyone measured $\delta\theta_x$'s and $\delta\theta_y$'s for the twenty-one fiducials are plugged into a least squares fit on the rectification polynomials 560. Step 570 uses a conventional pseudo-inverse fitting package to fit the free parameters $\alpha$ and $\beta$ to find a polynomial representation of the $\delta\theta_x$ and $\delta\theta_y$ functions for the errors between the measured and nominal positions of the fiducials.

Because there are twenty-one fiducials and only ten $\alpha$ and $\beta$ free parameters in the rectification polynomials, the fit is highly constrained. Step 575 computes a pseudo-$X^2$ goodness-of-fit between the N measured x and y galvanometer inputs for the N actual fiducials and the fitted $\delta\theta_x$ and $\delta\theta_y$ rectification polynomials. If the $X^2$ value indicates that the average error exceeds some threshold, e.g., three least counts in the galvanometer inputs, then the parameter fit is determined to be bad, and the program halts. The program also prints a diagnostic if any one of the fiducials is mis-fit by a large amount.

If the fitted rectification polynomial passes the $X^2$ test, rectification is complete. The designator head can be dismounted from the rectification gantry 300. When the designator head 100 is mounted at its service location, e.g. an aerospace manufacturer, the rectification polynomial computed for the designator is also installed into the correction box 402 at the service site. Now control computer 150 can treat the designator as if the galvanometers were ideal, and correction box 402 will apply correction values to the ideal values generated by control computer 150 to make the output of the galvanometers conform to the ideal model.

Referring again to FIG. 4, in one embodiment, the rectification polynomial is programmed into correction box 402 as a 65×65 grid of interpolation values. The grid is indexed by the nominal $\theta_x$ and $\theta_y$ values 400, and the grid entries are deltas to be added to produce output $\theta_x$ and $\theta_y$ values 404. Recall that the galvanometers are each driven by 16 bit inputs; thus the galvanometer counts run from 0 to 65,535, corresponding to 60° of limit-to-limit mirror deflection. To correct nominal $\theta_x$ and $\theta_y$ actual $\theta_x$ and $\theta_y$, the x and y galvanometer counts are each divided by 1024 to get the appropriate row and column of the interpolation grid. If both x and y are exactly divisible by 1024, the entry itself provides the correction values. If either is not divisible by 1024, either 1-dimensional or 2-dimensional interpolation may be used to interpolate between the surrounding entries to obtain correction values to be added to the input nominals. During rectification, the interpolation grid entries are developed by evaluating the rectification polynomial at each point having divisible-by-1024 coordinates as the last step of the rectification process.

In the first embodiment, both ends of each ray are measured and known: one end at the virtual origin of the Y mirror 108 and the other at a fiducial 130. In a second embodiment, shown in FIG. 6, only the fiducial end of each ray is known, and the other end of the ray is calculated from measurements of angles to the fiducials. Given that all the rays must pass through the same point at the apex, the location and orientation of the designator can be calculated from angular measurements to four or more fiducials. An accurate photogrammetric calculation, however, presupposes that the measuring instrument has already been rectified. Thus, rectification and position determination proceed by iterative convergence.

As the process begins, it is assumed that the current rectification coefficients, typically interpolation data or polynomial coefficients, are fairly close to correct. In step 600, a fixture consisting of fiducial plate 310 of FIG. 3, without the gantry and preferably containing fiducials in more than one plane, is positioned, without great care, under the designator, e.g. using a forklift or scissors lift. Step 602 bypasses the pre-existing rectification to measure the actual galvanometer inputs to aim the beam at each of the fiducials. Step 604 applies the inverse of the best-known rectification parameters to correct the actual galvanometer inputs, thus calculating the direction angles to the fiducials. From the direction angles, step 606 calculates a best estimate of the location and orientation of the designator. These calculations are well-known, from e.g. photogrammetry, to calculate the position and orientation of an aerial camera from the images of known points on the ground. In step 610, new rectification coefficients (for a polynomial or interpolation engine) are computed, for instance using the method of FIG. 5. In step 612, assuming that the rectification computed in step 610 is correct, the angular positions of the fiducials are measured again. Step 614 calculates a new location and orientation for the designator from the angles computed in step 612. Step 616 compares this new estimate of the designator's position to the one previously calculated (from step 606 or in the prior iteration's step 614). If the difference between the old and new positions exceeds a threshold, the method loops back to step 610. Else, if the difference is sufficiently small, the method has converged and is complete.

This embodiment substitutes iterative computation for the mechanical adjustments to establish orthogonality of step 500 of FIG. 5. The embodiment allows a simplification of the gantry apparatus of FIG. 3 as well, eliminating the need for translation and rotation provided by tilt plate 302 and clamps 314.

Figure 6:
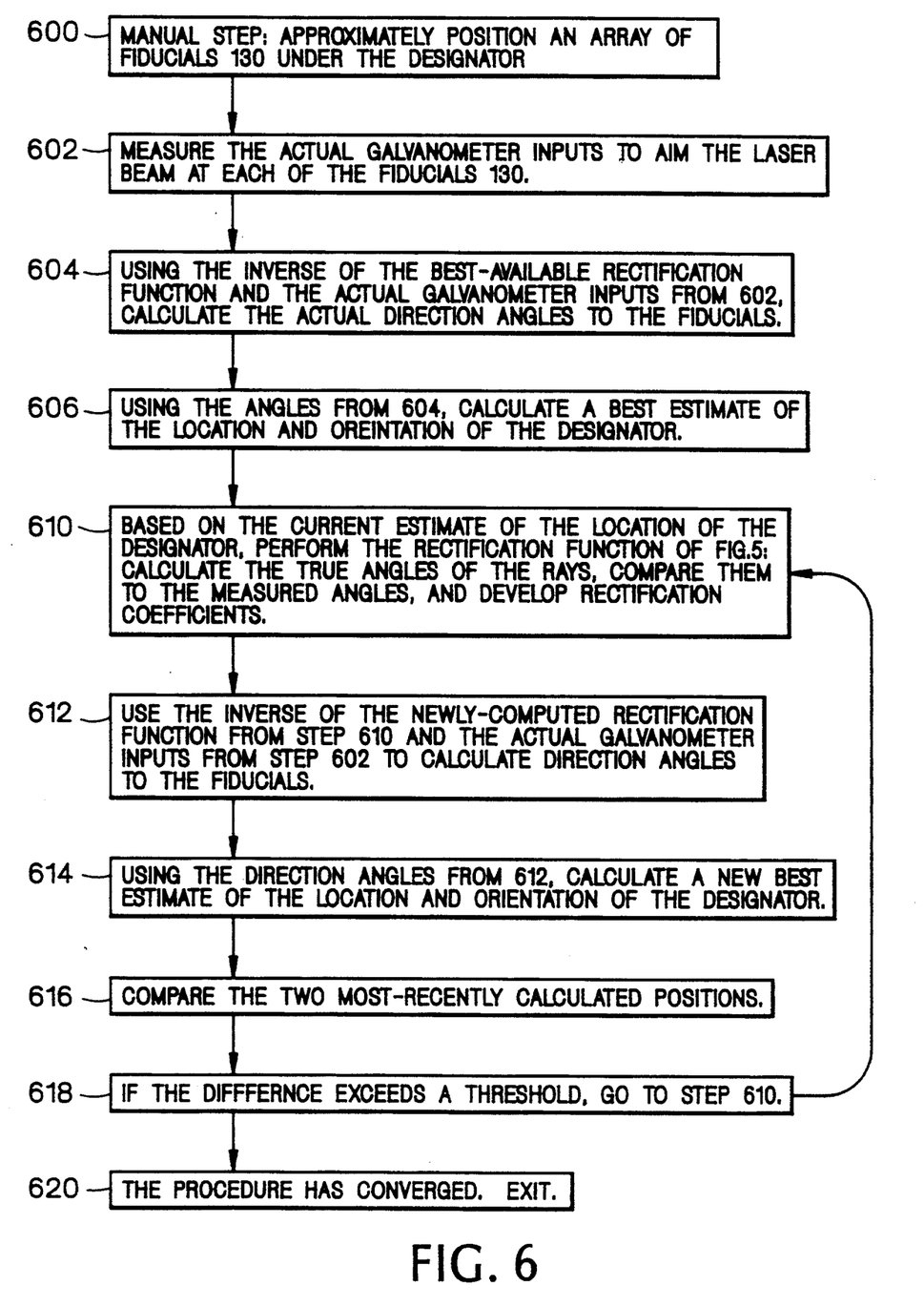
FIG. 6 is a flow chart of a second embodiment of the rectification process.

The second embodiment is particularly advantageous for in situ use after the equipment has been installed at its service location, e.g. an aerospace manufacturer. Because of concern for long-term drift due to, e.g., component ageing, it is usual to periodically re-rectify the designator. The method of FIG. 6 allows re-rectification without dismounting the designator and remounting it for rectification according to FIG. 5. Further, a designator that is installed for service has already been rectified at the factory, and the drift from perfect rectification is likely to be small; thus convergence of the method of FIG. 6 is more likely than for an unrectified designator.

In the second embodiment, it is desirable that the fiducials not all lie in one plane. This allows the resectioning of steps 610 and 650 to distinguish between, for instance, a fiducial array that is 5% closer than expected and galvanometers whose gain is 5% lower than specification. If, for instance, at least three of the fiducials are located above a plane containing the rest of the fiducials, then both the angles $\theta$ and the elevation z can be computed from the measured angles. Alternately, the distance from a plane array of fiducials to the Y mirror can be accurately measured to establish scale.

Among alternate embodiments are the following.

The mirrors in the designator may be replaced with any optical aiming device that deflects a laser, for instance a refracting prism or diffraction grating.

The galvanometers deflecting the mirrors may be replaced with any numerically controlled electromechanical device, for instance piezo-electric devices, stepper motors, etc.

The fiducials may also be photodiodes, or any other optical deflection device that can generate a signal when beam 114 hits it.

The plane mirror for finding the perpendicular to the fiducial plane could be replaced by a mercury pool, ensuring that the designator head is gravitationally centered above the fiducial plane.

A rotating pentaprism at the center of the fiducial plane that deflects the beam at 90° could be used to establish the designator head 100 at a perpendicular over the origin of the fiducial coordinate plane. Other embodiments are within the scope of the following claims.

What is claimed is:

1. A method for rectifying a laser pointing device that aims a laser beam by deflecting said laser beam through a series of optical deflection devices each controlled by a galvanometer controlled by an input, the method comprising the steps:
   providing a set of spaced-apart fiducial points, each having a precisely-known location relative to the other fiducial points;
   establishing in space a precisely-known position and angular orientation of said laser pointing device relative to said fiducial points;
   calculating nominal galvanometer inputs needed to aim the laser beam at said fiducial points assuming no error internal of said laser pointing device or in said established position and angular orientation;
   measuring actual galvanometer inputs that aim the laser beam at said fiducial points;
   determining the angular errors internal of the laser pointing device by comparing said actual galvanometer inputs to said nominal galvanometer inputs; and
   storing said determined angular errors in a form for use in converting nominal galvanometer inputs computed by a control to actual galvanometer inputs to compensate for said internal errors of said laser pointing device.

2. The method of claim 1 wherein the step of establishing said precisely-known position and angular orientation includes the step of:
   positioning said laser pointing device at a predetermined, fixed and precisely-known position and angular orientation relative to said fiducial points.

3. The method of claim 2 wherein the step of positioning said laser pointing device includes the steps of:
   providing a plane mirror in a known angular relationship to said fiducial points;
   adjusting the position and angular orientation of said laser pointing device, so that the beam is reflected back on itself, thereby establishing said laser pointing device on a perpendicular to said plane mirror.

4. The method of claim 2 wherein the step of positioning said laser pointing device includes the steps of:
   selecting a point with respect to said fiducial points; and
   providing a plane mirror in a known angular relationship to said fiducial points, said mirror passing through said selected point;
   adjusting the spatial position and angular orientation of said laser pointing device so that said beam, when aimed at said selected point, is reflected back on itself to establish said laser pointing device on a perpendicular to said plane mirror.

5. The method of claim 4 further comprising the step of:
   affixing said laser pointing device in a mounting clamp of a known height above said fiducial points, said clamp providing means for said adjusting of spatial position or angular orientation.

6. The method of claim 2 further comprising the step of:
   affixing said laser pointing device in a mounting clamp of a known height above said fiducial points.

7. The method of claim 2 wherein the step of establishing said position and angular orientation comprises the steps of:
   providing a plane mirror in a known angular relationship to said fiducial points, said fiducial points numbering at least six;
   providing predetermined inputs to said galvanometers;
   adjusting the spatial position and angular orientation of said laser pointing device so that said beam is reflected back on itself to establish said laser pointing device on a perpendicular to a plane relative to said fiducial points;
   selecting a point with respect to said fiducial points; and
   adjusting the spatial position and angular orientation of said laser pointing device relative to said fiducial points to aim said beam at said selected point with the galvanometers at said predetermined input;
   and wherein the step of measuring the actual galvanometer inputs that aim the laser beam at one of said fiducial points comprises the steps of:
   conducting a coarse scan to approximately angularly locate each said fiducial point; and
   conducting a fine scan to precisely locate the fiducial point within the approximate angular location established by the coarse scan;
   and further comprising the step of:
   using said laser pointer device and said stored angular errors to locate points in a three dimensional space.

8. The method of claim 1 wherein the step of establishing said position and angular orientation and the step of determining the angular errors internal of the laser pointing device are performed substantially simultaneously by iterative convergence.

9. The method of claim 8 wherein the step of establishing said position and angular orientation and the step of determining the angular errors internal of the laser pointing device are performed by a method comprising the steps of:
- positioning said laser pointing device at a fixed approximately-known position relative to said fiducial points;
- directing the beam at each of said fiducial points and measuring actual galvanometer inputs needed to direct the laser beam to said fiducial points from said fixed position;
- triangulating the position and angular orientation of said laser pointing device relative to said fiducial points from said measured actual galvanometer inputs needed to direct the laser beam to said fiducial points, assuming in the triangulation step that said angular errors internal of the laser pointing device are of initial value;
- from the triangulated position and angular orientation thus determined, calculating the angular error internal of the laser pointing device from said measured actual galvanometer inputs; and
- iterating the triangulating and calculating steps using the device internal errors determined in the preceding iteration until said triangulated position and angular orientation stabilize.

10. The method of claim 9 wherein said fiducial points are arranged to define a three-dimensional volume.

11. The method of claim 1 further comprising the step of:
- using said laser pointer device and said stored angular errors to locate points in a three dimensional space.

12. The method of claim 1 wherein the number of said fiducial points is at least six.

13. The method of claim 1 wherein the step of measuring the actual galvanometer inputs that aim the laser beam at said fiducial points comprises the steps of:
- conducting a coarse scan to approximately angularly locate each said fiducial point; and
- conducting a fine scan to precisely locate the fiducial point within the approximate angular location established by the coarse scan.

14. The method of claim 1 wherein the step of measuring the actual galvanometer inputs that aim the laser beam at one of said fiducial points comprises the steps of:
- controlling the optical deflection devices via inputs to said galvanometers to aim the beam at each of a plurality of angles in the vicinity of the fiducial point;
- combining the values of the angles of said plurality that generate a response from the fiducial point to find a centroid of the fiducial point.

15. The method of claim 1 wherein said stored angular errors are stored as a look-up table of correction values at a grid of galvanometer inputs, and an interpolation function between points of said grid.

16. The method of claim 1 wherein said stored angular errors are stored as a polynomial with parametric coefficients.

17. The method of claim 1 wherein
- at least some of said fiducial points are each defined by an optical device configured to reflect any incident beam back upon itself without regard to the angle of incidence; and
- said laser pointing device comprises a detector to detect said reflected beam and to detect the input to said galvanometers when said reflected beam is detected.

18. The method of claim 1 wherein
- at least some of said fiducial points are each defined by a sensor configured to generate a signal when said beam impinges on said sensor.

19. The method of claim 1 wherein said fiducial points lie substantially in a plane.

20. The method of claim 1 wherein said fiducial points are arranged to define a three-dimensional volume.

21. A method for establishing the position of a laser pointing device relative to a plurality of fiducial points each having a precisely-known location, the method comprising the steps of:
- providing an optical device for detecting perpendicularity of a beam to a plane in a known angular relationship to a coordinate system of said fiducial points;
- selecting a point in said plane at which the beam of said laser pointing device is to intersect said plane; and
- adjusting the spatial position and angular orientation of said laser pointing device relative to said fiducial points so that said optical device detects said perpendicularity when said beam is aimed at said selected point.

22. A method for measuring the position of an optically responsive device with a laser pointing device that aims a laser beam by deflecting said beam through a plurality of optical deflection devices each directed by a galvanometer controlled by an input, the method comprising the steps:
- controlling the optical deflection devices via inputs to said galvanometers to aim the beam at each of a plurality of angles in the vicinity of the optically responsive device;
- combining the values of the angles of said plurality that generate a response from the optically responsive device to find a centroid of the optically responsive device.

23. The method of claim 22 wherein said optically responsive device comprises an optical device configured to reflect any incident beam back upon itself, without regard to the angle of incidence and a detector to detect said reflected beam.

24. An apparatus for rectifying a laser pointing device that aims a laser beam by deflecting said beam through a plurality of optical deflection devices each directed by a galvanometer controlled by an input, the rectification apparatus comprising:
- an array of spaced-apart fiducial points, each having a precisely-known location relative to the other fiducial points;
- an optical angular detector device having a selected location and angular orientation with respect to said fiducial points, and configured to detect a laser beam directed at a selected angle at a selected point;
- a mounting gantry configured to position the laser pointing device at a selected height with respect to said fiducial points, and to aim the beam at said selected point at said selected angle, thereby triggering detection of said laser beam by said optical angular detector;

a control configured to carry out the steps of:

calculate nominal galvanometer inputs needed to aim the laser beam at said fiducial points assuming no error internal of said laser pointing device or in said established position and angular orientation;

measure actual galvanometer inputs that aim the laser beam at said fiducial points;

determine the angular errors internal of the laser pointing device by comparing said actual galvanometer inputs to said nominal galvanometer inputs; and store said determined angular errors in a form for use in converting nominal galvanometer inputs computed by a control to actual galvanometer inputs to compensate for said internal errors of said laser pointing device.

* * * * *

UNITED STATES PATENT AND TRADEMARK OFFICE
CERTIFICATE OF CORRECTION

PATENT NO. : 5,400,132

DATED : March 21, 1995

INVENTOR(S) : Pierre Trepagnier

It is certified that error appears in the above-identified patent and that said Letters Patent is hereby corrected as shown below:

Col. 3, line 1, delete "pointer", insert --pointing--.

Col. 4, line 61, delete capital "Y", insert lower case --y--.

Col. 7, line 27, insert hyphen (-) between twenty and one.

Col. 7, line 67, insert the word "to" after $\theta_y$ and actual.

Col. 8, line 13, delete capital "Y", insert lower case --y--.

Signed and Sealed this

Sixth Day of August, 1996

Attest:

BRUCE LEHMAN

Attesting Officer

Commissioner of Patents and Trademarks